United States Patent
Kim

(10) Patent No.: US 7,089,085 B2
(45) Date of Patent: Aug. 8, 2006

(54) METHOD OF CALIBRATING ROBOT

(75) Inventor: Eun-Chan Kim, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 150 days.

(21) Appl. No.: 10/314,359

(22) Filed: Dec. 9, 2002

(65) Prior Publication Data

US 2004/0010345 A1 Jan. 15, 2004

(30) Foreign Application Priority Data

Jul. 9, 2002 (KR) .......................... 2002-0039696

(51) Int. Cl.
*G05B 19/04* (2006.01)
*G05B 19/19* (2006.01)

(52) U.S. Cl. ...................... 700/254; 700/249; 700/246; 700/250; 700/251; 700/257; 700/258; 700/259; 700/262; 348/159; 982/103

(58) Field of Classification Search ................ 700/245, 700/254, 248, 249, 251–252, 260, 262, 247, 700/259, 264; 901/22, 23, 29, 1–3, 9, 16, 901/42, 47; 318/568.2, 568.23, 567, 568.11, 318/568.13, 556.17, 568.21; 414/730
See application file for complete search history.

(56) References Cited

U.S. PATENT DOCUMENTS

| | | | | |
|---|---|---|---|---|
| 3,699,868 A | * | 10/1972 | Shimomura | 396/287 |
| 4,831,549 A | * | 5/1989 | Red et al. | 700/254 |
| 5,528,116 A | * | 6/1996 | Snell | 318/568.13 |
| 5,687,293 A | * | 11/1997 | Snell | 700/254 |
| 5,751,610 A | * | 5/1998 | Gan et al. | 700/85 |
| 5,907,229 A | * | 5/1999 | Snell | 318/569 |
| 6,035,695 A | | 3/2000 | Kim | |
| 6,615,112 B1 | * | 9/2003 | Roos | 700/254 |
| 6,812,665 B1 | * | 11/2004 | Gan et al. | 318/568.11 |

OTHER PUBLICATIONS

Wu et al., Design of robot accuracy compensator after calibration, 1988, IEEE, p. 780-785.*

* cited by examiner

*Primary Examiner*—Thomas G. Black
*Assistant Examiner*—McDieunel Marc
(74) *Attorney, Agent, or Firm*—Staas & Halsey LLP

(57) ABSTRACT

Disclosed herein is a method of calibrating a robot. The robot has a robot arm with a mechanically restricted moving displacement. In the robot calibration method of the present invention, a first moving displacement between a normal position of the robot arm and a contact position, where the robot arm comes into contact with the body of the robot, is obtained. A second moving displacement between a current position of the robot arm and the contact position is obtained by moving the robot arm to the contact position. The current position of the robot arm is corrected to the normal position on the basis of a difference between the first and second moving displacements.

6 Claims, 4 Drawing Sheets

METHOD OF CALIBRATING ROBOT

BACKGROUND OF THE INVENTION

1. Field of the Invention

The present invention relates generally to a method of calibrating a robot, and more particularly to a method of calibrating a robot, which can perform calibration by the movement of a robot itself without requiring an additional calibration device.

2. Description of the Prior Art

Generally, if machineries or tools requiring precise position control, such as robots, are disassembled and reassembled for repair or change of parts, offset of the initial positions of moving parts, such as robot arms, which may be varied relative to their previous positions, can frequently occur.

Therefore, if the offset occurs due to the change of parts, etc., previous calibration data must be revised by performing calibration to correct the offset.

In the prior art, if parts of a robot are changed and the correction of offset is required, calibration is performed by using an exclusive calibration jig, or on the basis of a calibration mark indicated on the body of the robot.

FIG. 1 is a control flowchart of a conventional method of calibrating a robot using a calibration jig.

As shown in FIG. 1, an original working tool attached to the body of the robot is detached therefrom at step S10, and an exclusive calibration tool is attached to the body of the robot at step S11. If the exclusive calibration tool is attached to the body of the robot, calibration is performed using the exclusive calibration tool at step S12.

At step S13, calibration data are obtained using calibration results from the performance of the calibration at step S12. Prestored previous calibration data are revised using the calibration data obtained at step S13 so as to correct the offset at step S14.

If the calibration data are revised, the exclusive calibration tool is detached from the body of the robot at step S15. Thereafter, the original working tool is attached again to the body of the robot at step S16.

As described above, the conventional method using the calibration jig is problematic in that it requires high precision of the calibration jig, and a calibrating operation is very complicated and requires much time, because an operation of changing the original working tool and the exclusive calibration tool must be performed twice. Further, the conventional method is troublesome in that if an actual user performs the calibration personally, the user must retain the exclusive calibration jig.

Meanwhile, in the conventional method of performing calibration on the basis of the calibration mark indicated on the body of the robot, calibration data are revised using the current position of the robot, after moving the mark indicated on the robot body to a position where a reference mark is indicated to enable the marks to coincide with each other.

Such a conventional method using the reference mark does not have the inconvenience that tools must be attached or detached to/from the body of the robot; however, the conventional method using the reference mark is problematic in that precision of calibration is relatively low.

SUMMARY OF THE INVENTION

Accordingly, the present invention has been made keeping in mind the above problems occurring in the prior art, and an object of the present invention is to provide a method of calibrating a robot, which corrects offset by obtaining calibration information through contact with the body of a robot.

In order to accomplish the above object, the present invention provides a method of calibrating a robot, the robot having a robot arm joined to a robot shaft to a restrict moving displacement of the robot arm, comprising the steps of setting a reference position within the moving displacement; calculating a difference between an actual displacement when the robot arm reaches the reference position, and a preset normal displacement; and correcting the position of the robot arm on the basis of the calculated difference.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
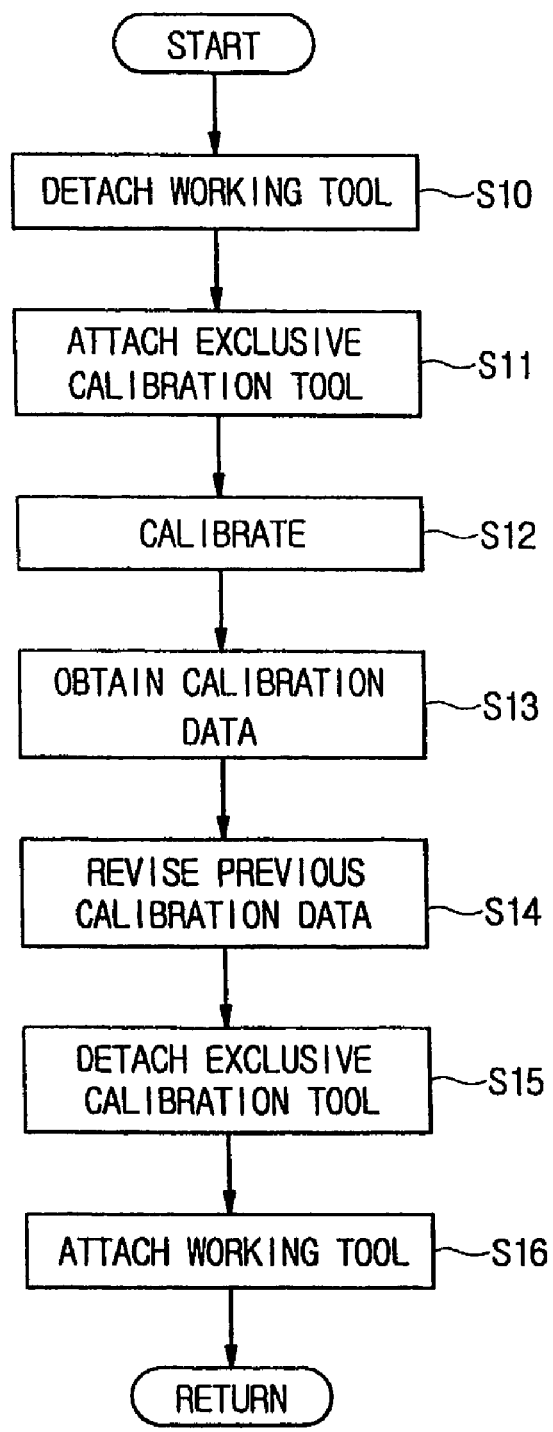
FIG. 1 is a control flowchart of a conventional method of calibrating a robot using a calibration jig.
Figure 2:
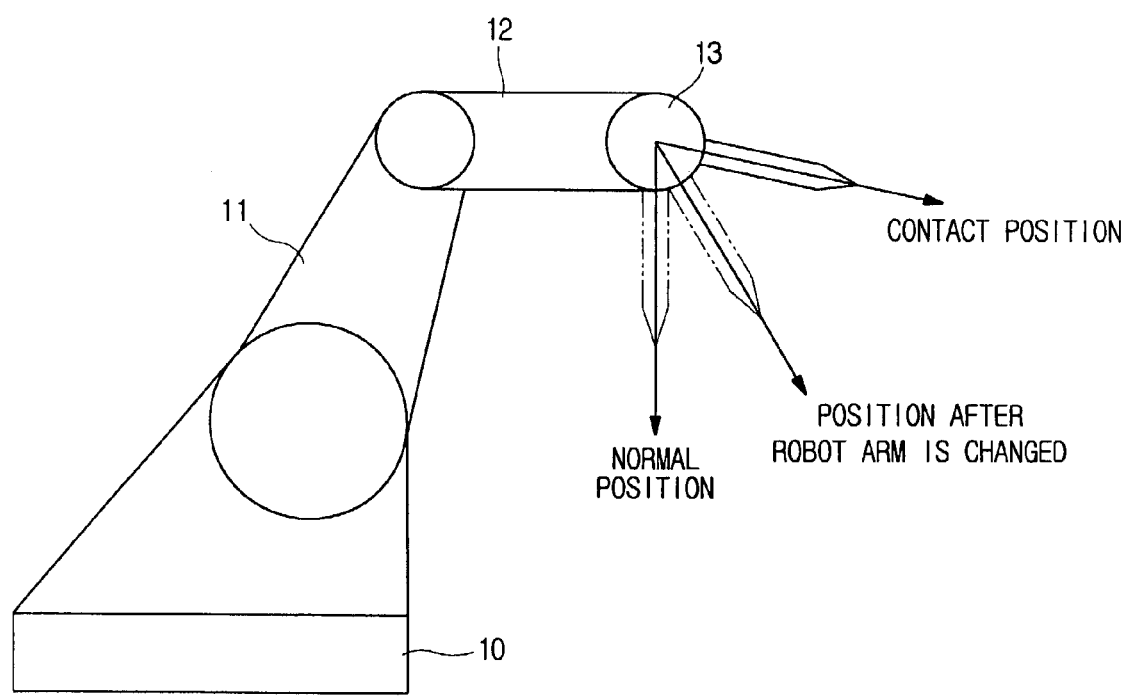
FIG. 2 is a view showing the operation of a robot according to a preferred embodiment of the present invention.

FIG. 2 is a view showing the operation of a robot according to a preferred embodiment of the present invention.

As shown in FIG. 2, a first shaft 11 is rotatably connected to the upper portion of a base 10, and a second shaft 12 rotating at a predetermined angle is connected to the upper portion of the first shaft 11. Further, a robot arm (working tool) 13 is joined to one end of the second shaft 12 to be rotatable at a predetermined angle.

Further, stopper projections (not shown) are formed on the robot arm 13 and the second shaft 12 to prevent the robot arm 13 from moving further by allowing the robot arm 13 to come into contact with the body of the robot when the robot arm 13 is rotated at an angle greater than the predetermined angle.

Such a robot arm 13 is rotated by the driving of a motor (not shown).

Figure 3:
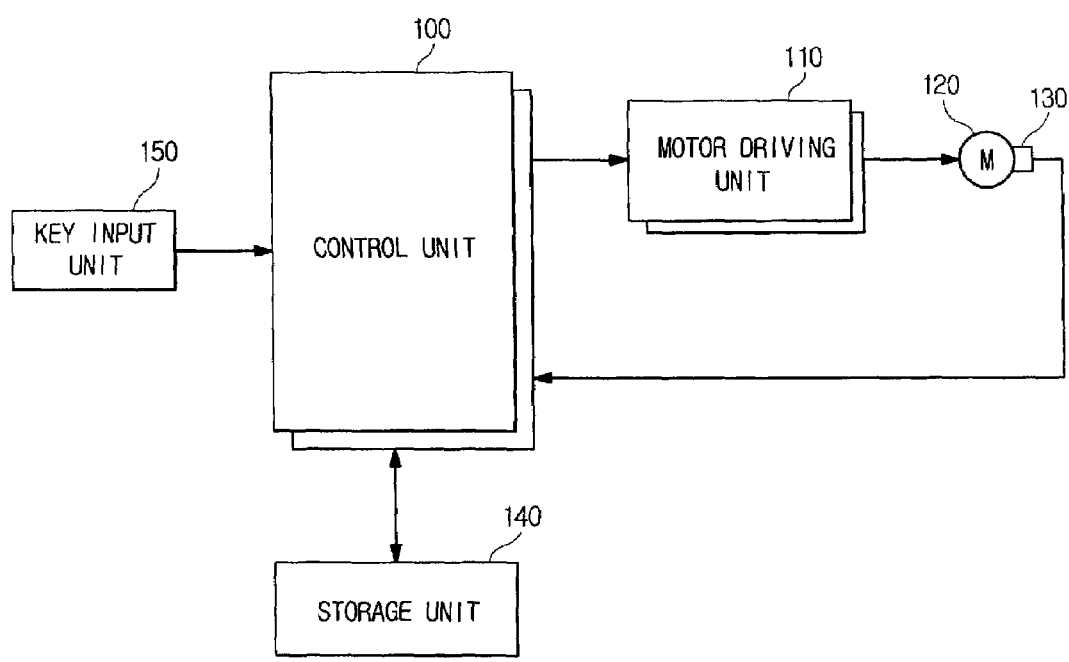
FIG. 3 is a control block diagram showing the calibration of a robot according to a preferred embodiment of the present invention.

FIG. 3 is a control block diagram showing the calibration of the robot according to a preferred embodiment of the present invention.

Referring to FIG. 3, an apparatus for calibrating a robot of the present invention comprises a key input unit 150, a motor driving unit 110, an encoder 130, a storage unit 140 and a control unit 100. The key input unit 150 is used to input commands from a user. The motor driving unit 110 operates a motor 120 which rotates either in a forward or a reverse direction to move the robot arm 13 to a desired position. The encoder 130 is connected to the motor 120 to obtain a moving displacement of the robot arm 13 according to the rotation of the motor 120. The storage unit 140 stores various pieces of information. The control unit 100 controls the storage unit 140 to store the moving displacement fed back through the encoder 130 therein, and controls the entire calibrating operation according to the various pieces of information stored in the storage unit 140.

Figure 4:
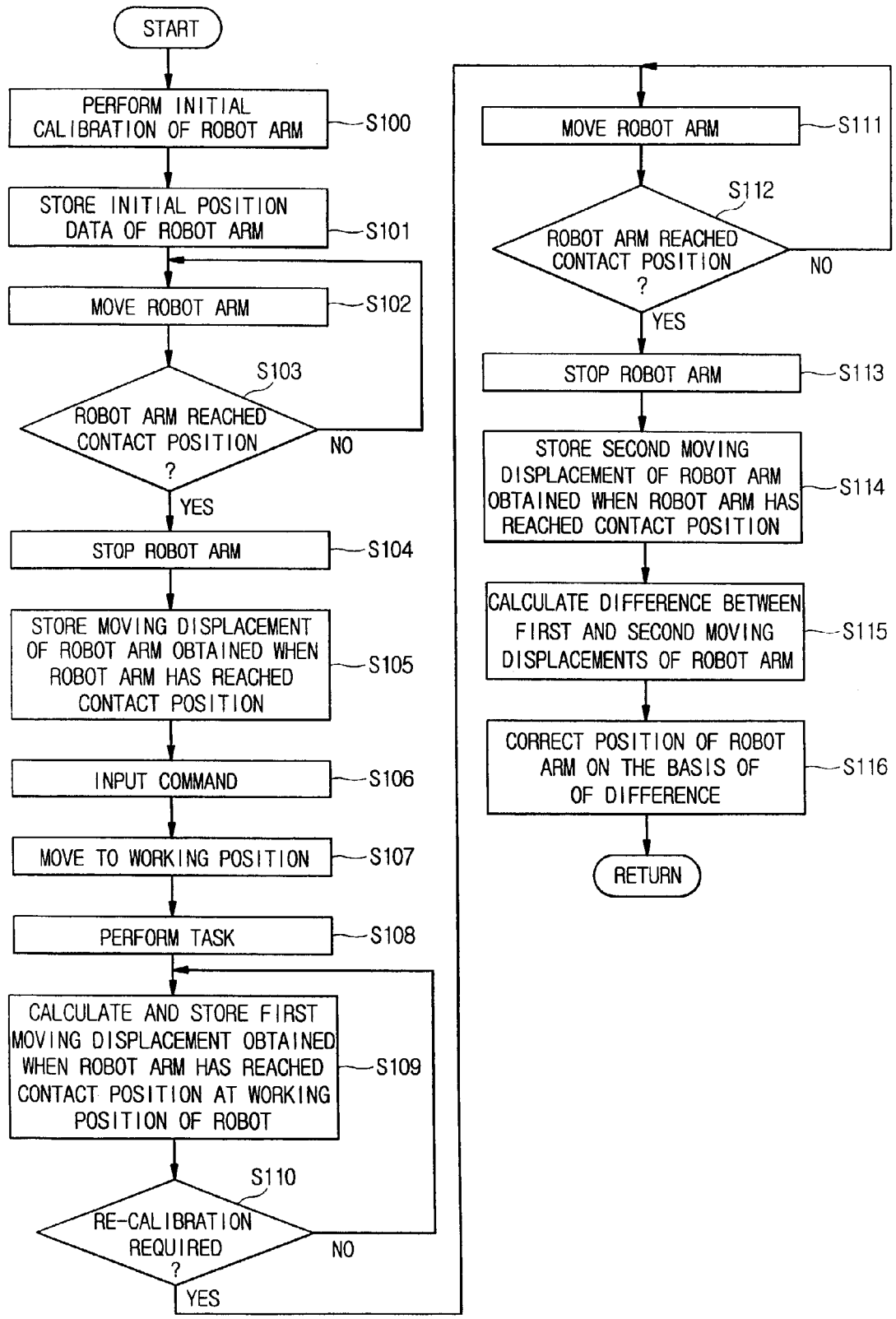
FIG. 4 is a control flowchart of a method of calibrating a robot according to the present invention.

FIG. 4 is a control flowchart of a method of calibrating a robot according to the present invention.

Referring to FIG. 4, the robot arm 13 is jointed to the second shaft 12, the control unit 100 performs the initial calibration using a self-calibration program of the robot arm 13, which is stored in the storage unit 140 and is provided by a manufacturing company at step S100.

Further, the control unit 100 stores correction data obtained by the performance of the initial calibration in the storage unit 140 at step S101.

The control unit 100 operates the motor 120 through the motor driving unit 110 to allow the robot arm 13 to move to a contact position at step S102. At this time, the control unit 100 inputs the moving displacement of the robot arm 13, which is fed back through the encoder 130.

The control unit 100 determines whether the robot arm 13 has reached the contact position where the robot arm 13 does not rotate any longer and comes into contact with the body of the robot, on the basis of the moving displacement of the robot arm 13 obtained through the encoder 130 at step S103. If the robot arm 13 has reached the contact position, the robot arm 13 cannot rotate any longer, so the amount of load of the motor 120 is temporarily increased, thus varying the rotating speed of the motor 120. Accordingly, the output signal of the encoder 130 is varied, and the control unit 100 determines that the robot arm 13 has reached the contact position on the basis of the varied output signal of the encoder 130.

If it is determined that the robot arm 13 has reached the contact position at step S103, the control unit 100 stops the movement of the robot arm 13 by stopping the motor 120 through the motor driving unit 110 at step S104.

The control unit 100 stores the moving displacement of the robot arm 13 obtained through the encoder 130 in the storage unit 140 as a first moving displacement at step S105.

Meanwhile, a corresponding command for performing a desired task is inputted from the user via the key input unit 150, after initial position data of the robot arm 13, obtained when the initial calibration is performed, and the moving displacement of the robot arm 13, obtained when the robot arm 13 has reached the contact position, are stored in the storage unit 140 at step S106.

If the command has been inputted, the control unit 100 moves the motor 120 to a corresponding working position through the motor driving unit 110 at step S107. If the motor 120 moves to the corresponding working position, the control unit 100 performs the corresponding task using the robot arm 13 at step S108. In this case, the control unit 100 calculates a first moving displacement obtained when the robot arm 13 has reached the contact position at a corresponding working position on the basis of the moving displacement obtained at step S105 and stores the first moving displacement in the storage unit 140 at step S109.

While working, the robot arm 13 is sometimes detached from the body of the robot and re-joined to the body due to repair or change of the robot arm 13. In such a case, it is required to perform the calibration of the robot arm 13 again.

The control unit 100 determines whether a command for re-calibrating the robot arm 13 has been inputted from the user through the key input unit 150, so as to check whether re-calibration is required at step S110.

If it is determined that the command for re-calibration has been inputted at step S110, the control unit 100 determines that the re-calibration is required, and drives the motor 120 through the motor driving unit 110 to move the robot arm 13 to the contact position at step S11. At this time, the control unit 100 inputs the moving displacement of the robot arm 13, which is fed back through the encoder 130.

The control unit 100 determines whether the robot arm 13 has reached the contact position on the basis of the output signal of the encoder 130 at step S112.

If the robot arm 13 has reached the contact position at step S112, the control unit 100 stops the movement of the robot arm 13 by stopping the motor 120 through the motor driving unit 110 at step S113.

Further, the control unit 100 stores a second moving displacement obtained when the robot arm 13 has reached the contact position at step S114. In this case, the control unit 100 obtains the moving displacement of the robot arm 13 through the encoder 130.

If the second moving displacement of the robot arm 13 is stored, the control unit 100 calculates a difference between the first moving displacement of the robot arm 13 obtained at step S105 and the second moving displacement at step S115.

If the difference is calculated, the control unit 100 corrects the current position of the robot arm 13 on the basis of the calculated difference at step S116.

As described above, the present invention provides a method of calibrating a robot, which can promptly obtain relatively precise calibration data using calibration position data obtained by moving a robot arm on the basis of a reference position on a moving displacement of the robot arm, without requiring an additional calibration device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of calibrating a robot, the robot having a robot arm joined to a robot shaft to restrict a moving displacement of the robot arm, the method comprising:

setting a reference position within the moving displacement;

calculating a difference between an actual displacement when the robot arm reaches the reference position, and a preset normal displacement; and correcting a position of the robot arm based on the calculated difference, the setting of the reference position comprising setting a single reference position.

2. The robot calibration method according to claim 1, wherein the reference position is a position in which the robot arm comes into contact with the robot shaft.

3. The robot calibration method according to claim 1, wherein the actual displacement is a position between a current position of the robot arm and the reference position.

4. The robot calibration method according to claim 1, wherein the preset normal displacement is a position between a normal position of the robot arm and the reference position.

5. A method of calibrating a robot, the robot having a robot arm joined to a robot shaft to restrict a moving displacement of the robot arm, the method comprising:

obtaining a first moving displacement between a normal position of the robot arm and a contact position where the robot arm comes into contact with the robot shaft;

obtaining a second moving displacement between a current position of the robot arm and the contact position by moving the robot arm to the contact position; and
correcting the current position of the robot arm to the normal position based on a difference between the first and second moving displacements.

6. An apparatus to calibrate a robot, comprising:
an input unit to input commands from a user;
a motor driving unit to operate a motor, which rotates in a forward and reverse direction to move a robot arm of the robot to a desired position;
an encoder connected to the motor to obtain data on an actual displacement and a preset normal displacement of the robot arm according to the rotation of the motor;
a storage unit to store the data output from the encoder; and
a control unit to control a calibrating operation of the robot based on the data stored in the storage unit.

* * * * *